United States Patent [19]

Matsui et al.

[11] Patent Number: 4,670,814

[45] Date of Patent: Jun. 2, 1987

[54] HIGH-TENSION CAPACITOR

[75] Inventors: Goro Matsui, Amagasaki; Katsuyoshi Kiba, Takarazuka; Kiyoshi Terasaka, Kadoma; Yuichi Aoyama, Osaka, all of Japan

[73] Assignee: Risho Kogyo Co., Ltd., Osaka, Japan

[21] Appl. No.: 797,035

[22] Filed: Nov. 12, 1985

[30] Foreign Application Priority Data

Sep. 27, 1985 [JP] Japan .................. 60-215919

[51] Int. Cl.⁴ .................. H01G 1/08; H01G 4/38
[52] U.S. Cl. .................. 361/274; 361/329
[58] Field of Search .......... 361/328, 329, 330, 274

[56] References Cited

U.S. PATENT DOCUMENTS

| | | | |
|---|---|---|---|
| 1,511,935 | 10/1924 | Bayles et al. | 361/274 |
| 1,816,641 | 7/1931 | Dubilier | 361/274 |
| 2,162,475 | 6/1939 | Brooks | 361/274 X |
| 3,331,910 | 7/1967 | Grimmer et al. | 361/274 X |
| 3,441,816 | 4/1969 | Butrico | 361/274 |
| 3,454,842 | 7/1969 | Wurster | 361/274 |
| 3,689,811 | 9/1972 | Hoffman | 361/329 X |

Primary Examiner—Donald A. Griffin
Attorney, Agent, or Firm—Wenderoth, Lind & Ponack

[57] ABSTRACT

An improved high-tension capacitor is proposed which uses no insulation oil or gas. Not only the dielectric layers in the capacitor elements are impregnated with synthetic resin, but also the capacitor elements are insulated with synthetic resin by impregnating the insulation material around the capacitor elements with synthetic resin. The insulating layer around the capacitor elements is formed with a plurality of air ducts.

2 Claims, 5 Drawing Figures

HIGH-TENSION CAPACITOR

BACKGROUND OF THE INVENTION

The present invention relates to a high-tension capacitor, and more particularly to a high-tension capacitor having an improved structure for the radiating the heat therefrom.

In order to meet the requirements of an oilless arrangement for high-tension capacitors, Japanese patent application No. 60-59228 proposes a high-tension capacitor comprising a plurality of capacitor elements formed by being moled and located a synthetic resin instead of a capacitor having the periphery of the capacitor elements surrounded with insulating oil. The above-mentioned Japanese patent application relates to a high-tension capacitor comprising a plurality of cylindrically (FIG. 3) or flatly (FIG. 4) formed capacitor elements 1 connected in parallel and formed into an integral structure by molding them with a synthetic resin such as epoxy resin which serves as an insulating layer 2.

As shown in FIG. 5, the dielectric layer 3 of each capacitor elements 1 is composed of a synthetic resin film 5 made of polyester, polypropylene or the like and held between porous insulating layers 4 made of nonwoven fabric, cloth or the like. The insulating layers 4 are impregnated with a synthetic resin in a vacuum either before or at the same time when the synthetic resin is molded into the insulating layer 2.

Although the high-tension capacitor as constructed above has high dielectric strength and is highly noninflammable and explosion-proof, it has a disadvantage in that, because each capacitor element is surrounded by a synthetic resin forming an insulating layer, heat generated in each capacitor element will not escape therefrom and resulting in the capacitor elements abnormally heating up particularly these capacitors having a high capacity.

SUMMARY OF THE INVENTION

It is an object of the present invention to provide a high-tension capacitor which obviates the above-described disadvantage by providing a means for the dissipation of heat from capacitor elements.

According to the present invention, air ducts for air-cooling the capacitor elements are provided in the insulating layer formed around the capacitor elements.

With the above-described object in view and as will become apparent from the following detailed description, the present invention will be more clearly understood in connection with the accompanying drawings, in which:

DETAILED DESCRIPTION OF THE PREFERRED EMBODIMENT

Figure 1:
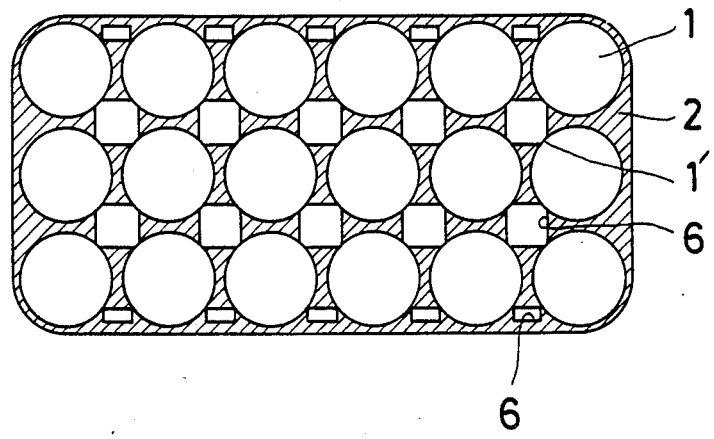
FIG. 1 is a sectional view of an embodiment of the present invention.
Figure 2:
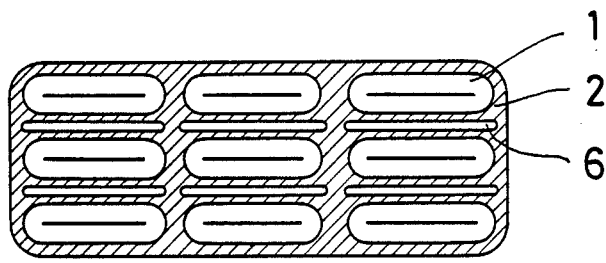
FIG. 2 is a sectional view of another embodiment.
Figure 3:
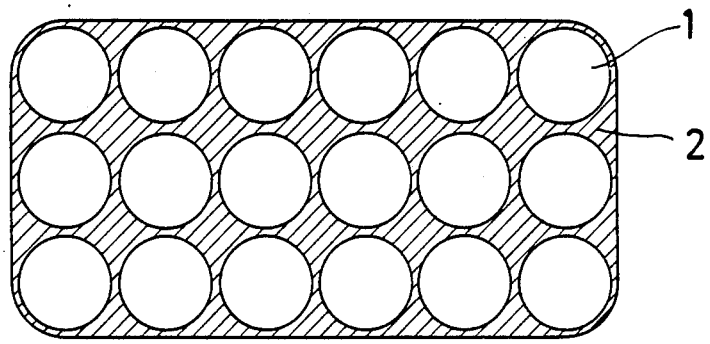
FIGS. 3 and 4 are sectional views of conventional high-tension capacitors.
Figure 4:
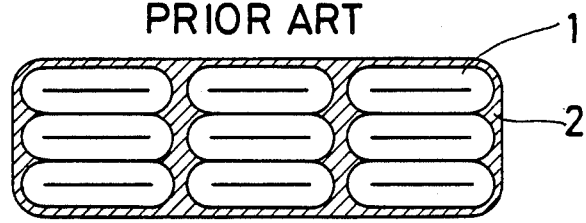
Figure 5:
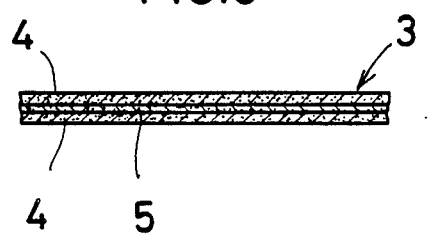
FIG. 5 is a sectional view of a dielectric layer.

Basically, the embodiments of the present invention shown in FIGS. 1 and 2 are similar in construction to the high-tension capacitors shown in FIGS. 3 and 4, respectively. A plurality of circularly or flatly formed capacitor elements 1 are connected in parallel and arranged in rows. Around the elements 1 a synthetic resin such as epoxy resin is molded to form an insulating layer 2. The dielectric layer 3 (FIG. 5) of each capacitor element 1 is impregnated with the synthetic resin either beforehand or at the time when the synthetic resin is molded into the insulating layer 2.

The present invention consists in the provision of a plurality of air ducts 6 in the insulating layer 2. The air ducts 6 extend axially or in parallel with the axes of the capacitor elements 1 and may have any suitable cross section e.g., square as shown in FIG. 1 or elliptical as shown in FIG. 2.

The air ducts 6 may be formed at the same time when the synthetic resin is molded into the insulating layer 2. As shown in FIG. 1, the air ducts 6 may be formed in such a manner that a portion 1' of the peripheral surface of each capacitor element 1 is exposed to the interior of each air duct 6 so that air passing therethrough will directly come in touch with the capacitor element 1.

For cooling the capacitor elements 1, air may be allowed to pass through the air ducts 6 by natural or forced ventilation.

The effect of the present invention is that the capacitor elements 1 can have a long life because of the provision of means for air-cooling the capacitor elements 1.

What we claim is:

1. A high-tension capacitor comprising:
   a plurality of capacitor elements extending parallel to and spaced from one another and each of which is comprised of alternating layers of electrode and dielectric each of which has a closed looped cross-section, said dielectric being impregnated with a synthetic resin;
   an insulating layer molded to and surrounding a substantial portion of the outer periphery of each of said plurality of capacitor elements for forming an integral high-tension capacitor comprised of said plurality of capacitor elements and said insulating layer, said insulating layer being of electrical insulating material impregnated with a synthetic resin; and
   said insulating layer having a plurality of air ducts extending therethrough, said air ducts each extending parallel to said plurality of capacitor elements and located between the outer peripheries of at least two of said capacitor elements for allowing air to pass therethrough to cool said capacitor elements.

2. A high-tension capacitor as claimed in claim 1 wherein, said air ducts are opened to portions of the outer periphery of said capacitor elements.

* * * * *